(12) United States Patent
Schulze

(10) Patent No.: US 7,376,593 B2
(45) Date of Patent: May 20, 2008

(54) METHODS AND COMPUTER READABLE STORAGE MEDIUM FOR CONDUCTING A REVERSE AUCTION

(75) Inventor: Arne Schulze, Dachau (DE)

(73) Assignee: SAP Aktiengesellschaft, Walldorf (DE)

( * ) Notice: Subject to any disclaimer, the term of this patent is extended or adjusted under 35 U.S.C. 154(b) by 909 days.

(21) Appl. No.: 10/286,390

(22) Filed: Oct. 31, 2002
(Under 37 CFR 1.47)

(65) Prior Publication Data
US 2004/0083156 A1 Apr. 29, 2004

Related U.S. Application Data

(60) Provisional application No. 60/393,639, filed on Jul. 2, 2002.

(51) Int. Cl.
*G06Q 30/00* (2006.01)
*G06F 17/30* (2006.01)
(52) U.S. Cl. ............................. 705/26; 705/27; 705/37
(58) Field of Classification Search ...................... 705/1, 705/26–27, 37
See application file for complete search history.

(56) References Cited

U.S. PATENT DOCUMENTS

| 5,794,207 | A | 8/1998 | Walker et al. | |
|---|---|---|---|---|
| 5,845,265 | A | 12/1998 | Woolston | |
| 6,647,373 | B1 * | 11/2003 | Carlton-Foss | 705/37 |
| 2002/0059134 | A1 * | 5/2002 | Ebbs et al. | 705/37 |
| 2003/0004850 | A1 * | 1/2003 | Li et al. | 705/37 |
| 2004/0215467 | A1 * | 10/2004 | Coffman et al. | 705/1 |
| 2005/0015305 | A1 * | 1/2005 | Agarwal | 705/26 |

FOREIGN PATENT DOCUMENTS

WO          WO 01/27839 A1 *  4/2001

OTHER PUBLICATIONS

"Dynamic Attributes". Agarwal, Sumit. SAP AG 2002, Analysis of an Alternative Solution. Obtained from U.S. Appl. No. 10/623,116.*
"SAPMarket Power mySAP.com". Business/High Tech Editors. Business Wire. Jun. 14, 2000 [obtained from Proquest Database Apr. 23, 2007].*
"E-Commerce Interoperability with IBM's WebSphere Commerce Products". Dias, D.M. IBM Systems Journal. 2002. [obtained from Proquest database Apr. 23, 2007].*
"Andale Luanches major new functionality in auction management services for small business eCommerce". PR Newswire. May 30, 2000. [recovered from Dialog database on Sep. 1, 2008].*
"SAP and BackWeb announce Strategic Alliacne". Business Wire. Mar. 7, 2000. [recovered from Dialog database on Sep. 1, 2008].*

* cited by examiner

*Primary Examiner*—Matthew S. Gart
*Assistant Examiner*—William J. Allen
(74) *Attorney, Agent, or Firm*—Fish & Richardson P.C.

(57) ABSTRACT

Systems and techniques to create and conduct a reverse auction include creating a reverse auction object having a number of components; and copying information from a number of components in a Request for Quotation (RFQ) object into corresponding components of the reverse auction object. Bids received for the RFQ may be copied into the reverse auction object, and information in the bids may be validated. If the bids do not include information required for the reverse auction object, the bid may be marked as incomplete.

19 Claims, 6 Drawing Sheets

METHODS AND COMPUTER READABLE STORAGE MEDIUM FOR CONDUCTING A REVERSE AUCTION

CROSS REFERENCE TO RELATED APPLICATIONS

This application claims the benefit of priority of U.S. Provisional Application Ser. No. 60/393,639, filed Jul. 2, 2002, entitled "Dynamic Bidding Tool", and incorporated herein by reference.

BACKGROUND

The following description relates to online bidding systems, for example, a system and method for creating and conducting a reverse auction.

In electronic commerce, dynamic systems for commercial transactions provide a number of advantages not available in static systems. In general, a dynamic system is one in which the characteristics of potential transactions, as well as the universe of available transactions, may change over time. An online auction is an example of a dynamic system. In contrast, a static system is one in which the characteristics of a potential transaction generally do not change. An offer to sell a product at a fixed price on a company's web site is an example of a static system.

Conventional dynamic systems for commercial transactions, such as online auction sites, generally provide companies or other entities with an efficient avenue for buying and selling goods and services. For example, an auction may be opened to a much wider range of participants when conducted online. However, conventional online systems tend to be limited in flexibility, security, and/or functionality.

SUMMARY

The following description teaches systems and techniques for creating and conducting online reverse auctions.

In one aspect, a dynamic bidding application enables an initiator, e.g., a potential purchaser of goods and/or services, at an initiator site to create objects representing opportunities, such as Request for Quotations (RFQs) and reverse auctions. The initiator can convert an RFQ object into a reverse auction object, for example, if the results from the RFQ are not satisfactory. Information in the RFQ object can be copied into a newly created reverse auction object. The RFQ object may then be set to a closed status. The information copied from the RFQ object may include information copied from a header component, line item component(s), and dynamic attribute component(s), which may be mandatory, user-defined attributes.

Bids received for the RFQ may be copied into the reverse auction object. Since attributes may be changed or added in the conversion process, the information in the bids may be validated. If the bids do not include information required for the reverse auction, the bid may be marked as incomplete.

A reverse auction based on a reverse auction object may be held as a live (real-time) auction. If the bidding activity exceeds a certain threshold at the designated closing time for the reverse auction, the reverse auction may be automatically extended. The extension period may be for a predetermined time period, or may continue until the frequency of bids received falls below a certain threshold.

The systems and techniques described here may provide one or more of the following advantages. For example, if the RFQ opportunity process does not produce bids that meet expectations, the initiator can convert the RFQ opportunity into a reverse auction, which may further drive down the supplier prices. Also, continued bidding through an automatically extended closing time may further drive down prices. Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to online bidding systems.

Figure 1:
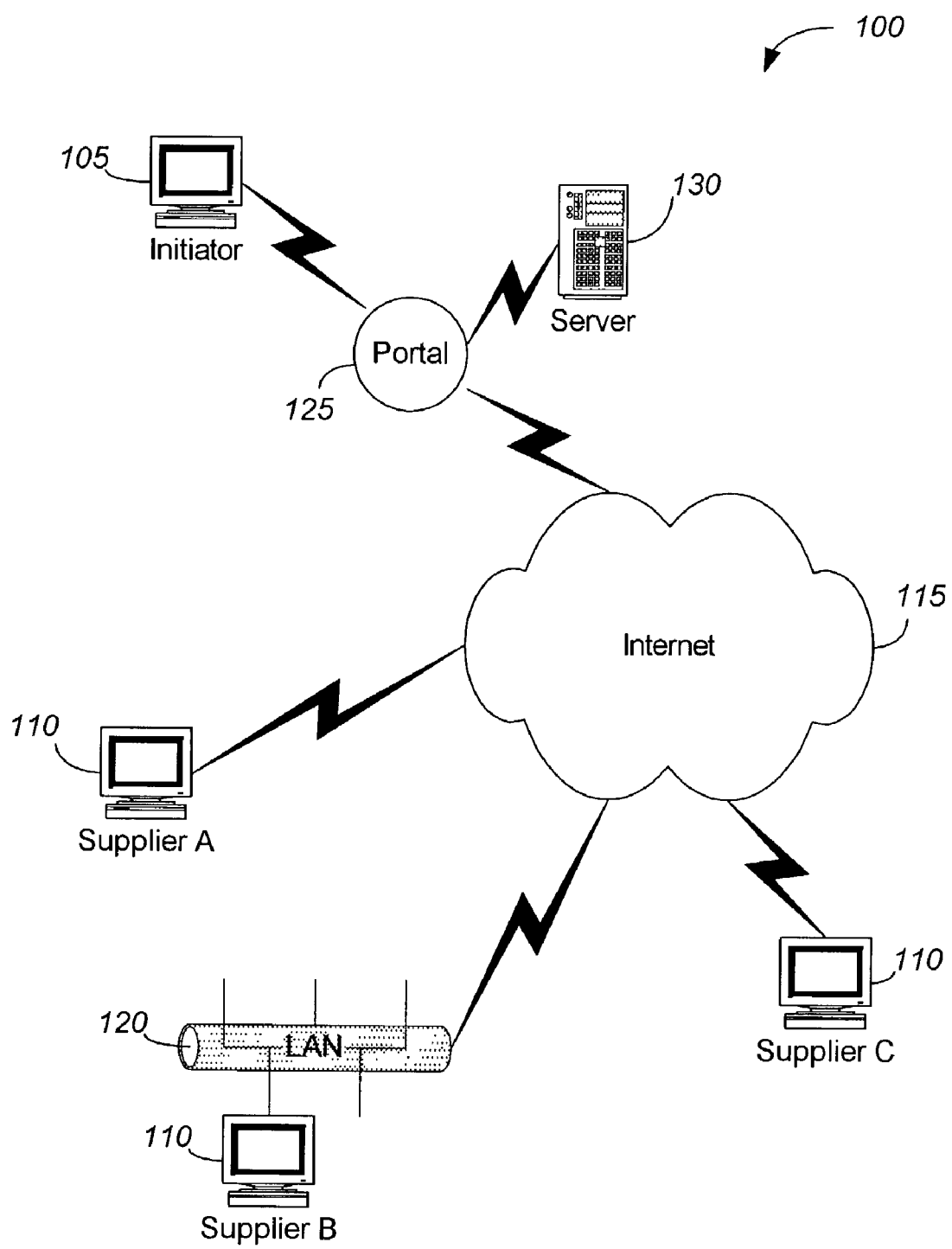
FIG. 1 shows a block diagram of an online bidding system

FIG. 1 illustrates a networked computer system 100. The system may include client computers at an initiator site 105 and supplier sites 110 which communicate over the internet 115. The client computers may be connected to the internet through other networks (e.g., local area networks 120 (LANs) or intranets) and/or a portal 125.

An initiator, e.g., a potential purchaser of goods and/or services, can use a dynamic bidding application to create opportunities on which potential suppliers may place bids. The initiator may be a human operator interacting with software running on a computer system, or an automated software process executing without human intervention, or various combinations of both. The dynamic bidding application may reside, at least partially, at the initiator site 105 and/or a server 130. The opportunities may include requests for quotations (RFQs) and reverse auctions. A request for quotation (RFQ) is a solicitation document used by purchasers to obtain offers for goods or services to be used in a purchasing process. RFQs generally include such information as price, delivery terms, and conditions. A reverse auction is an auction that uses the bid-down principle, in which the price being bid descends during the auction and the lowest bid is the winning bid. In general, the bidders are sellers or suppliers of goods or services who are offering to supply the requested good or service at the bid price. A reverse auction can provide buyers with significant cost savings by better leveraging competition among suppliers.

Figure 2:
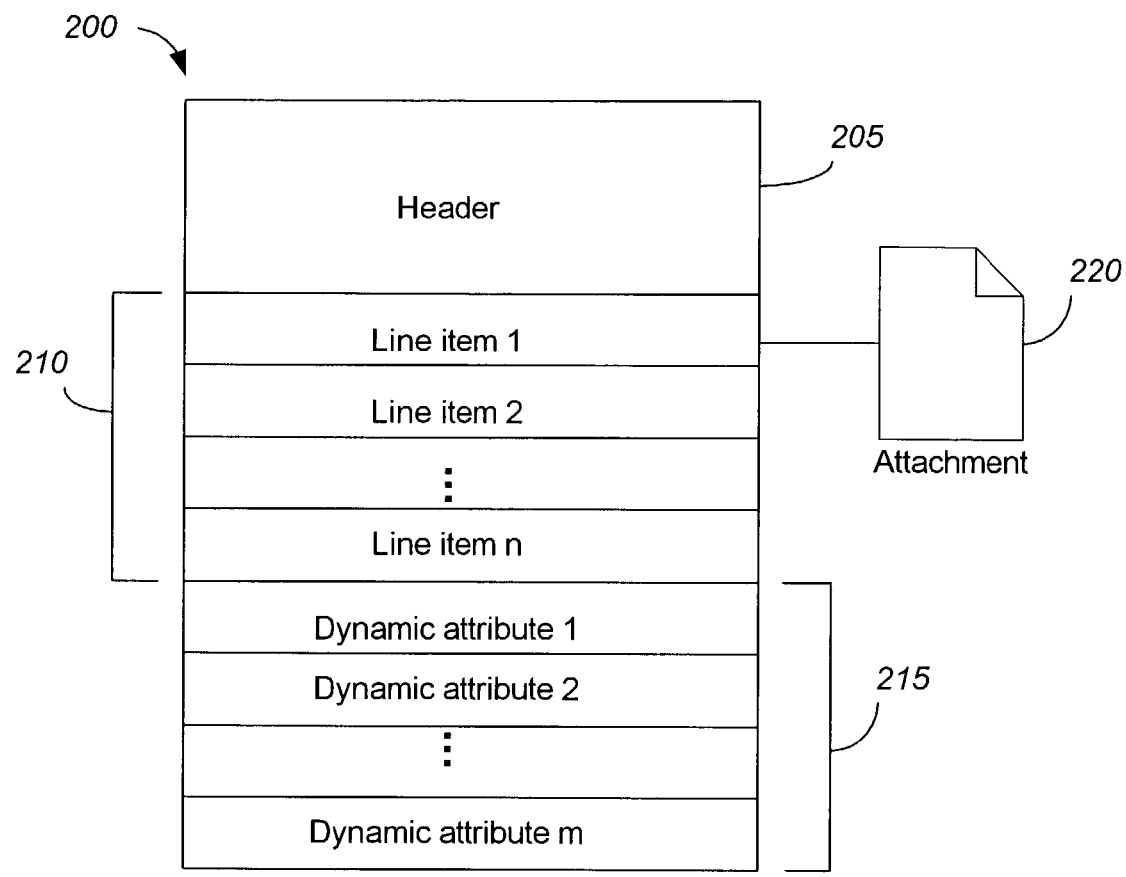
FIG. 2 shows a block diagram illustrating the structure of an opportunity object.

Opportunities such as RFQs and reverse auctions may be represented as objects in the dynamic bidding application. The opportunities may share a similar format 200, such as that shown in FIG. 2. An opportunity may include a header 205, one or more line items 210, dynamic attributes 215, and attachments 220. The header may include general information about the opportunity, such as a bidding rule profile (described below), classification, terms and conditions, and duration. Line items identify products or services to be sourced. Dynamic attributes are essentially additional fields that can be used to customize an RFQ or reverse auction for the initiator's particular needs or industry. Dynamic attributes can be added to provide potential bidders with additional information or in order to obtain additional information from bidders. Attachments can be of any file type and can be added to line items in the opportunity.

Figure 3:
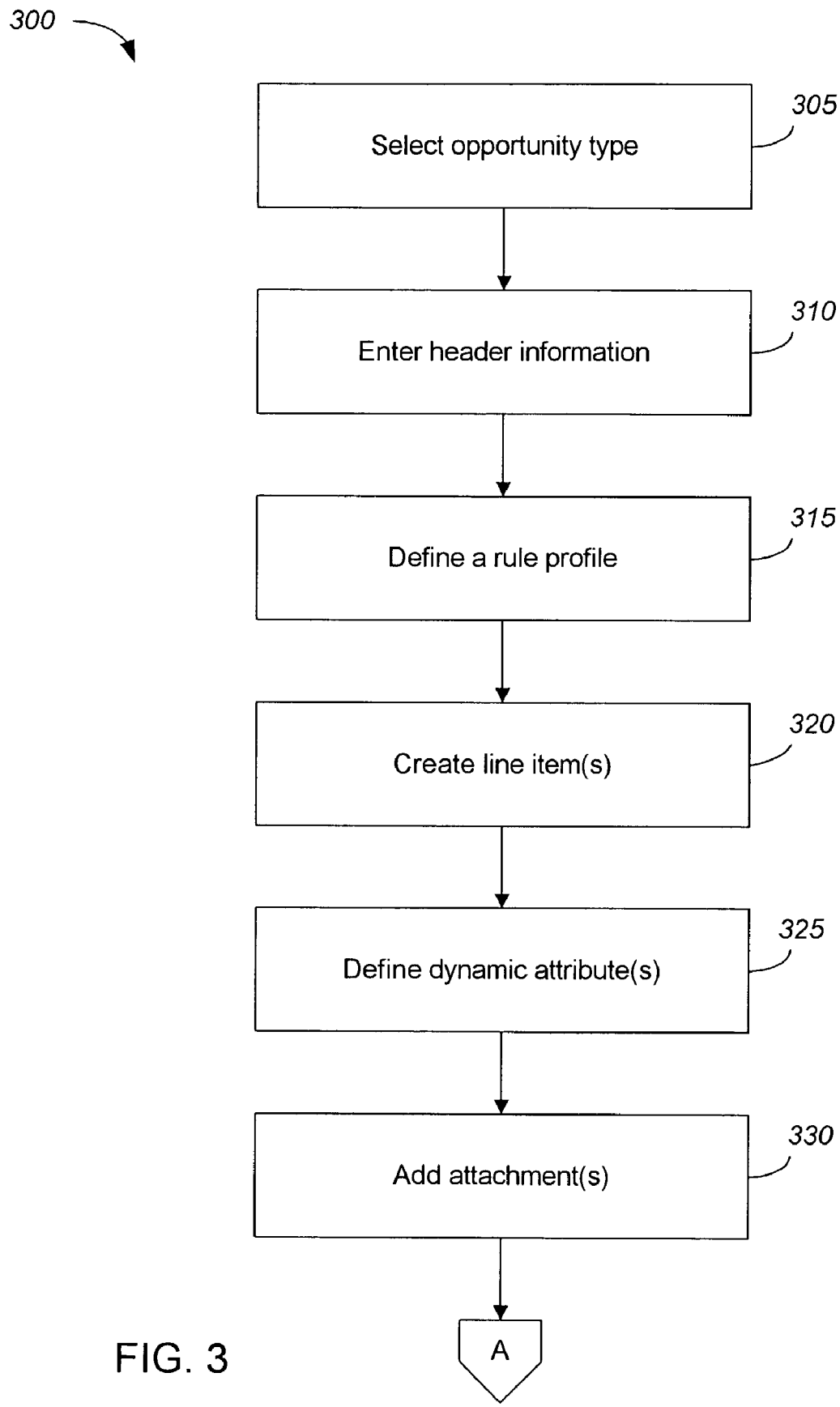
FIGS. 3 and 4 show a flowchart showing a process for creating an opportunity.

FIG. 3 is a flowchart describing a method 300 for generating an opportunity. The initiator first selects an opportunity type, e.g., RFQ or reverse auction (block 305). The initiator may then enter header information (block 310). The header information may include basic information such as a name and classification for the opportunity. The header may also include an access type for the opportunity, e.g., public or private. Public opportunities may be posted to one or more portals. Private opportunities may only be available to a defined list of suppliers, e.g., a distribution list.

The initiator may define a rule profile for the opportunity in the header. The rule profiles may be pre-configured sets of rules that control the behavior of the opportunity.

Rule profiles for RFQs may define how a supplier can bid on the line items in the opportunity. For example, a "broken/full" RFQ rule profile may support broken lots, in which the supplier can bid for a single line item in the RFQ, but only for the full quantity of that item. A "broken/partial" RFQ profile may support broken lots, in which the supplier can submit a bid for any quantity of a single line item in the RFQ. A "full/full" RFQ rule profile may support only full lots, which means that bidders must submit a bid for the RFQ as a whole, i.e., all of the line items, each at full quantity. RFQ rule profiles may also define starting and closing dates and times.

Rule profiles for reverse auctions may include rules that allow bidders to bid on full or broken lots and full or partial quantities. Reverse auction rules may also define starting and closing date and time, starting prices, and reserve prices. The rules may define a sealed auction, in which bidders are restricted from viewing any information on bids already submitted, including the identify of other bidders and whether or not theirs is the leading bid.

One type of reverse auction is a reverse "Yankee" auction, in which broken lots and partial quantities are supported. Bidders may submit bids on single line items and are not required to bid on the full quantity of that item. Bidders can also view all the information associated with other submitted bids, so strategic bidding becomes possible.

In a reverse Yankee auction, more than one winner per line item is possible, and each winning bidder pays his or her own bid price. For example, consider a reverse Yankee auction for one line item with a quantity of one hundred, a start price of $100 USD, and a close time of 09:30. Three bidders participate in the auction as follows:

| Bidding Activity | | | |
|---|---|---|---|
| Time | Bidder | Bid Price | Bid Quantity |
| 09:00 | Bidder A | $100 USD | 100 |
| 09:05 | Bidder B | $80 USD | 70 |
| 09:27 | Bidder C | $90 USD | 30 |
| 09:29 | Bidder A | $89 USD | 30 |
| End of Auction | | | |

In this example, Bidder B would be awarded 70 of the line items at a price of $80 USD each and Bidder A would be awarded 30 at $89 USD each. Even though Bidder A originally bid on the full quantity, Bidder A did not want to go lower than the price quoted by Bidder B. So instead, Bidder A placed a bid for the outstanding quantity at a price that still beat the next lowest bidder, even if only by $1 USD. This way, Bidder A still gets to sell a portion of his goods at a price that is satisfactory to him or her.

Once the opportunity header information has been entered, the initiators can start creating line items for the opportunity (block 320). The line items describe the goods or services the initiator wishes to procure. Line items can be added by free text entry or selected from a product master or from a catalog.

The initiator may define dynamic attributes for the opportunity (block 325). Dynamic attributes may be divided into two categories: initiator attributes and respondent attributes. Initiator attributes may be added by the initiator and completed by the initiator. Respondent attributes may be added by the initiator and completed by respondents in their bids.

Dynamic attributes may include data entry fields for the bidder to enter information. The type of data may be defined for a field, e.g., numerical (integer or floating point), textual, and yes/no (checkbox). Some examples of dynamic attribute fields might include a checkbox for indicating whether or not a process is compliant with a certain standard, a text-entry field for specifying the name and model number of a piece of equipment, and a number-entry field where the initiator can specify a required specification, e.g., the gauge of wire needed. The dynamic attributes may be defined as mandatory or not mandatory (i.e., optional).

The initiator may add attachments to an opportunity (block 330). Attachments can provide additional information about the line item, e.g., product specifications. Attachments can also contain collateral information, e.g., non-disclosure agreements. Attachments can be of any file type, and can be attached to the opportunity itself or components of the opportunity, e.g., line items.

Figure 4:
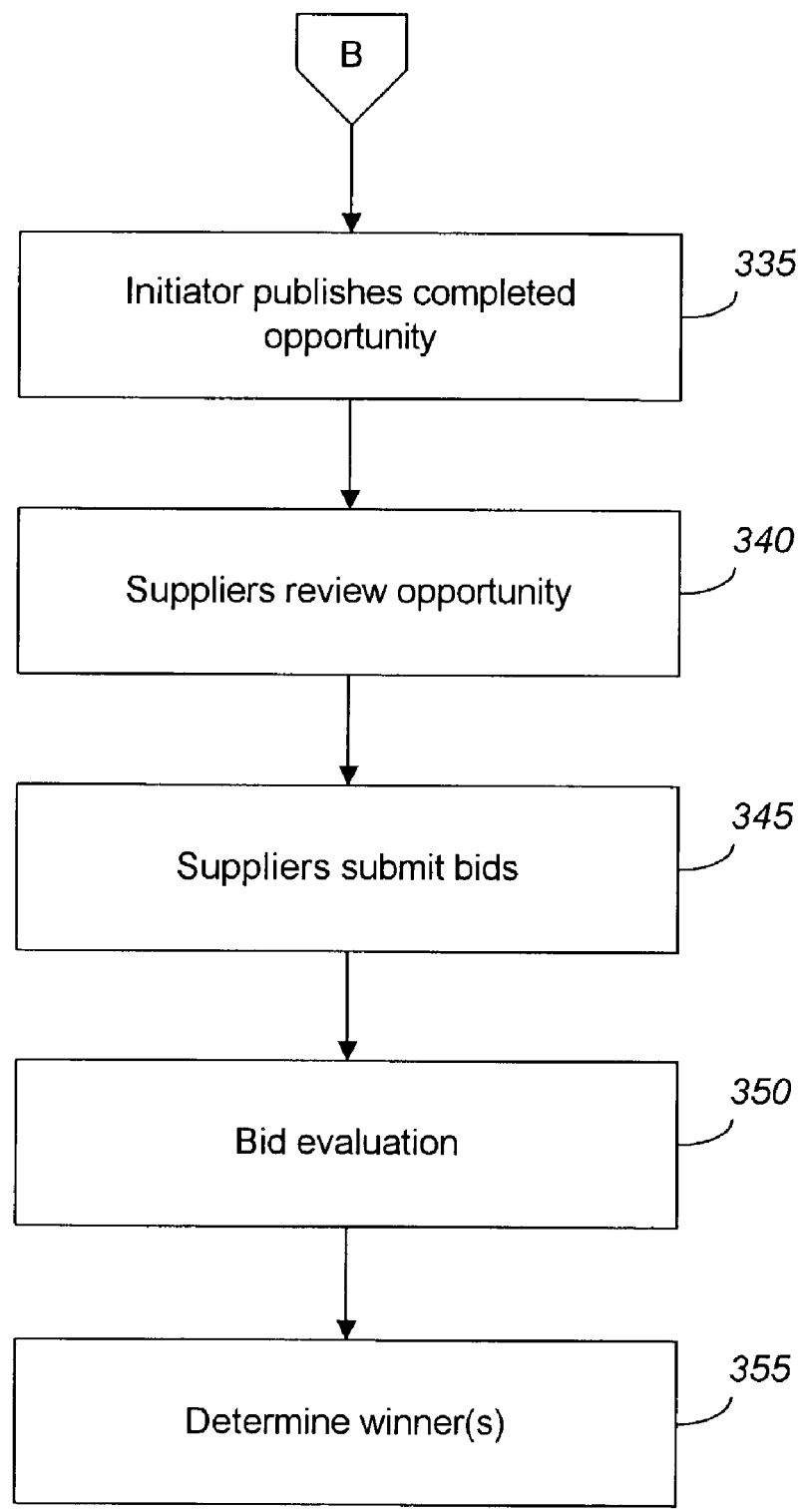

The initiator can publish the completed opportunity, e.g., to a portal if the opportunity is public, or to an invitation list consisting of distribution lists and individual users if the opportunity is not public (block 335 in FIG. 4). This allows potential suppliers the chance to review the opportunity (block 340). Once the opportunity is activated, suppliers can submit bids (block 345) on variable quantities up to the full quantity of every line item depending on whether or not the opportunity has been defined as full lot or broken lot and if partial quantities are permitted. The initiator can review bids while the opportunity is still active or wait until it has closed and all bids have been received.

The initiator can evaluate bids online for simple opportunities or offline for more complicated ones (block 350). For offline evaluation, all opportunity and bid information can be downloaded to a file, such as an Excel™ spreadsheet file.

Once the opportunity is closed, a winner may be determined (block 355). The initiator selects suppliers as the source for variable quantities up to the full quantity of every line item depending on whether or not the opportunity was defined as full lot or broken lot and if partial quantities were permitted.

In some instances, it may be desirable to convert an RFQ into a reverse auction. For example, if the RFQ opportunity process does not produce bids that meet expectations, the initiator can convert the RFQ opportunity into a reverse auction, which may further drive down the supplier prices.

Figure 5:
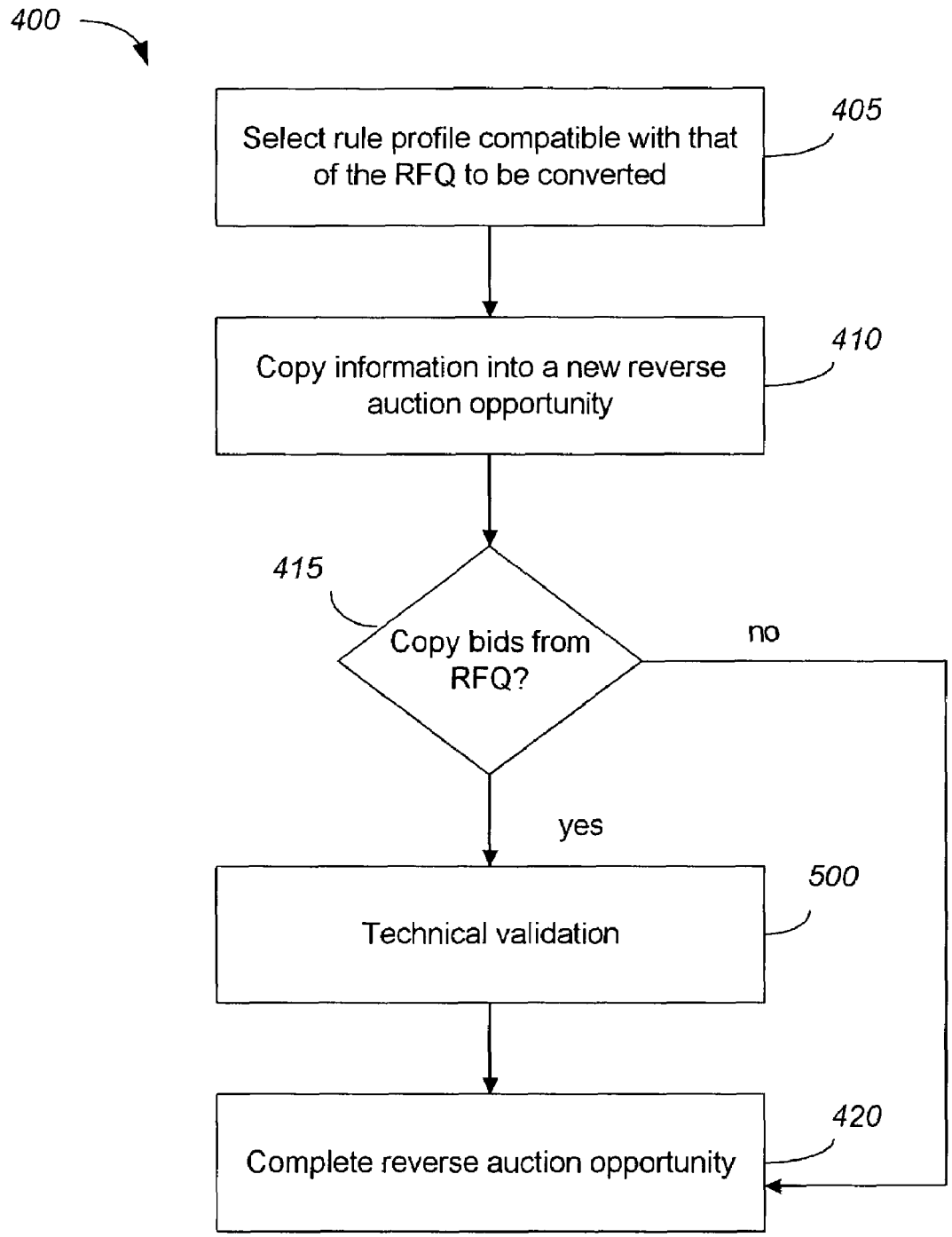
FIG. 5 is a flowchart showing a process for converting a Request for Quotation (RFQ) object into a reverse auction object.

FIG. 5 is a flowchart describing an operation 400 for converting an RFQ opportunity into a reverse auction opportunity. The initiator may select a reverse auction rule profile compatible with the rule profile of the RFQ (block 405). All information in the RFQ, e.g., information in the header, line items, dynamic attributes, and attachments, may be copied into a new reverse auction opportunity. The initiator can modify or add information in the reverse auction opportunity (block 410). For example, the initiator may add a dynamic attribute or change a distribution list in the header. Also, if the reverse auction rule profile requires starting prices for the line items, the initiator may be prompted to add a starting price.

Figure 6:
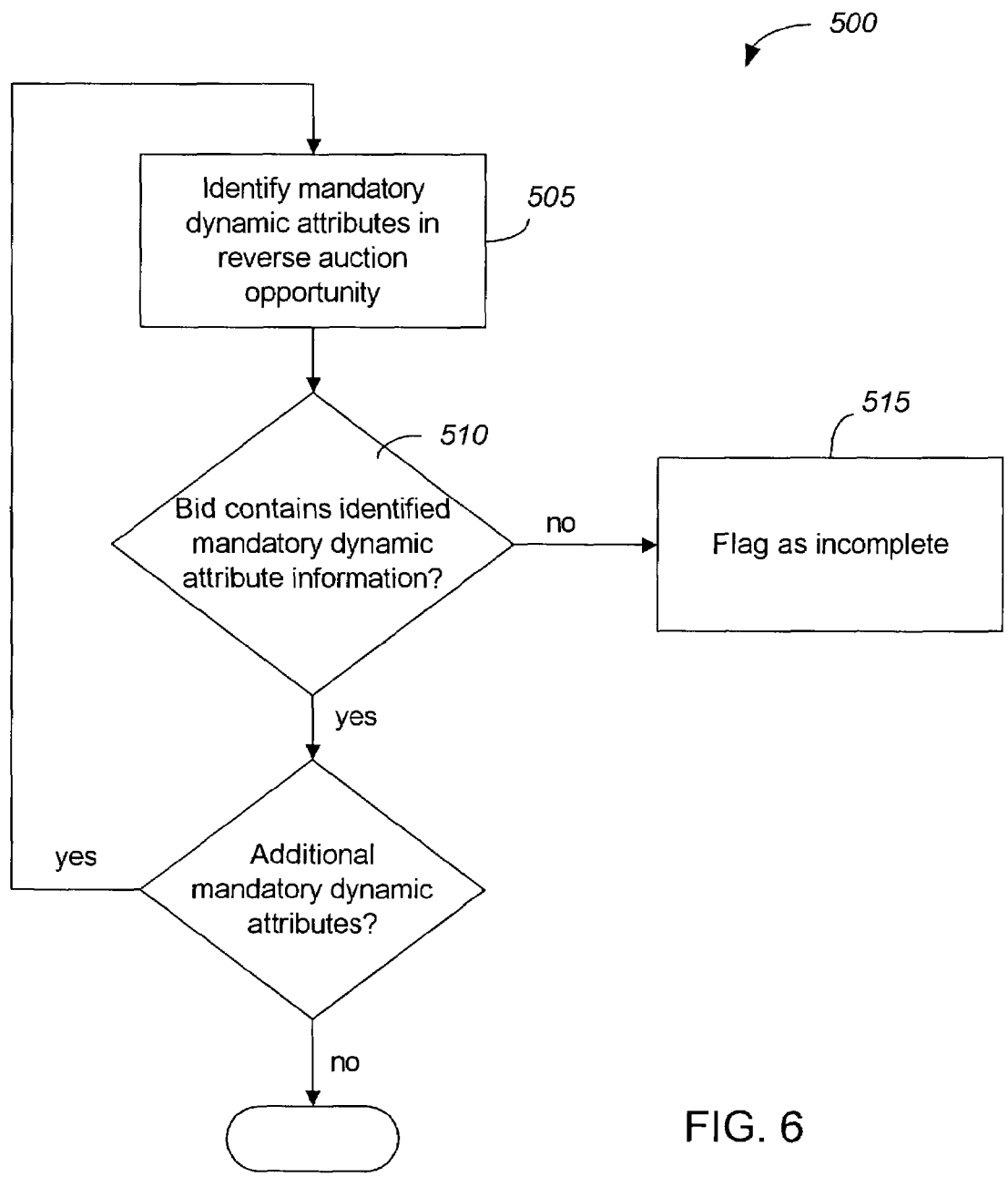
FIG. 6 is a flowchart showing a process for validating a bid copied from an RFQ into a corresponding reverse auction object.

The initiator may copy bids received for the RFQ or discard them (block 415). A technical validation operation 500, shown in FIG. 6, may then be performed on the retained bids. The technical validation operation 500 determines if the bids are still valid for the reverse auction. Any mandatory dynamic attributes in the reverse auction opportunity are identified (block 505). For each identified mandatory dynamic attribute, the technical validation operation determines whether the bid contains the required information for the dynamic attribute (block 510). If the bid does not contain the required information, the bid is tagged as incomplete (block 515). For example, the initiator may have added a mandatory dynamic attribute that requires the supplier to enter a color in the bid. However, if this was not a dynamic attribute in the RFQ, the suppliers may not have specified a color in the bids copied over from the RFQ. These bids would fail technical validation and these bids would be flagged as incomplete. The suppliers may then be given the opportunity to modify the bid to satisfy the new dynamic attribute. The initiator may then complete the reverse auction object (block 420).

A reverse auction based on a reverse auction object may be published or held as live auctions, which are typically fast-paced and highly competitive. There may be a rule for live reverse auctions which automatically extends the closing time defined in the header in response to bidding activity. For example, if bids are coming in at a predetermined, rapid frequency at the scheduled closing time, the auction may be extended, thereby enabling continued bidding. The continued bidding may further drive down prices on the line items. The auction may be extended for a predetermined time period, or until the frequency of bids falls below a predefined threshold.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

Although only a few embodiments have been described in detail above, other modifications are possible. The logic flows depicted in FIGS. 3-6 do not require the particular order shown, or sequential order, to achieve desirable results. For example, adding attachments to an opportunity object may be performed at many different places within the overall process. In certain implementations, multitasking and parallel processing may be preferable.

Other embodiments may be within the scope of the following claims.

What is claimed is:

1. A method for conducting a reverse auction, comprising:
   creating for a specified buyer an electronic request for quotation (RFQ) object that has a plurality of components and that specifies a good or service to be purchased;
   conducting a request for quotations over a communications network in which information from the RFQ object is sent to one or more potential vendors so that vendors send quotations to the buyer for evaluation;
   in response to determining that the results of the request for quotations are not satisfactory, converting the RFQ object into a reverse auction object by creating an electronic reverse auction object having a plurality of components;
   copying information from the components in the electronic RFQ object into corresponding components of the electronic reverse auction object, and
   conducting, using information from the electronic reverse auction object, a reverse auction using a communications network to identify a winning vendor to supply to the buyer the specified good or service at a price determined in the reverse auction.

2. The method of claim 1, further comprising:
   setting an opportunity status for the RFQ object to a closed status.

3. The method of claim 1, wherein copying information comprises copying information from a header component.

4. The method of claim 1 wherein copying information comprises copying information from a line item component.

5. The method of claim 1, wherein copying information comprises copying information from an attribute component.

6. The method of claim 1, further comprising:
   adding a mandatory attribute to the reverse auction object.

7. The method of claim 6, wherein the mandatory attribute comprises a user-defined attribute.

8. The method of claim 7, further comprising:
   copying a bid associated with the RFQ object; and
   associating the copied bid with the reverse auction object.

9. The method of claim 8, further comprising:
determining whether the copied bid includes information satisfying the mandatory attribute; and
selectively designating the copied bid as incomplete in response to a determination that the copied bid does not include information satisfying the mandatory attribute.

10. An article comprising a machine-readable storage medium storing instructions operable to cause a machine to perform operations comprising:
creating for a specified buyer an electronic request for quotation (RFQ) object that has a plurality of components and that specifies a good or service to be purchased;
conducting a request for quotations over a communications network in which information from the RFQ object is sent to one or more potential vendors so that vendors send quotations to the buyer for evaluation;
in response to determining that the results of the request for quotations are not satisfactory, converting the RFQ object into a reverse auction object by creating an electronic reverse auction object having a plurality of components;
copying information from the components in the electronic RFQ object into corresponding components of the electronic reverse auction object, and
conducting, using information from the electronic reverse auction object, a reverse auction using a communications network to identify a winning vendor to supply to the buyer the specified good or service at a price determined in the reverse auction.

11. The article of claim 10, further comprising instructions operable to cause the machine to perform operations comprising:
setting an opportunity status for the RFQ object to a closed status.

12. The article of claim 10, wherein the instructions operable to cause a machine to copy information comprise instructions operable to cause the machine to copy information from a header component.

13. The article of claim 10, wherein the instructions operable to cause the machine to copy information comprise instructions operable to cause the machine to copy information from an line item component.

14. The article of claim 10, wherein the instructions operable to cause the machine to copy information comprise instructions operable to cause the machine to copy information from an attribute component.

15. The article of claim 14, wherein the attribute component comprises a user-defined attribute.

16. The article of claim 10, further comprising instructions operable to cause the machine to perform operations comprising:
adding a mandatory attribute to the reverse auction object.

17. The article of claim 16, further comprising instructions operable to cause the machine to perform operations comprising:
copying a bid associated with the RFQ object; and
associating the copied bid with the reverse auction object.

18. The article of claim 17, further comprising instructions operable to cause the machine to perform operations comprising:
marking the copied bid as incomplete in response to determining that the copied bid does not include information satisfying the mandatory attribute.

19. A method for conducting a reverse auction, comprising:
creating for a specified buyer an electronic request for quotation (RFQ) object that has a plurality of components and that specifies a good or service to be purchased;
conducting a request for quotations over a communications network in which information from the RFQ object is sent to one or more potential vendors so that vendors send quotations to the buyer for evaluation;
in response to determining that the results of the request for quotations are not satisfactory, converting the RFQ object into a reverse auction object by:
creating a reverse auction object having a plurality of components including a header component, a line item component and an attribute component;
copying information from a header component in the RFQ object into the header component of the reverse auction object;
copying information from a line item component in the RFQ object into the header component of the reverse auction object;
copying information from an attribute component in the RFQ object into the header component of the reverse auction object;
setting an opportunity status for the RFQ object to a closed status;
adding a mandatory attribute to the reverse auction object;
copying a bid associated with the RFQ object;
associating the copied bid with the reverse auction object;
determining whether the copied bid includes information satisfying the mandatory attribute; and
selectively designating the copied bid as incomplete in response to a determination that the copied bid does not include information satisfying the mandatory attribute;
conducting, using information from the electronic reverse auction object, a reverse auction using a communications network to identify a winning vendor to supply to the buyer the specified good or service at a price determined in the reverse auction.

* * * * *